(12) United States Patent
Casaldaliga Albisu et al.

(10) Patent No.: US 10,185,900 B2
(45) Date of Patent: Jan. 22, 2019

(54) PAGE-WIDE ARRAY PRINTING

(71) Applicant: Hewlett-Packard Development Company, L.P., Houston, TX (US)

(72) Inventors: Marcos Casaldaliga Albisu, Sant Cugat del Valles (ES); M. Isabel Borell Bayona, Sant Cugat del Valles (ES); Leticia Rubio, Sant Cugat del Valles (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 17 days.

(21) Appl. No.: 15/316,463

(22) PCT Filed: Jun. 5, 2014

(86) PCT No.: PCT/EP2014/061737
§ 371 (c)(1),
(2) Date: Dec. 5, 2016

(87) PCT Pub. No.: WO2015/185145
PCT Pub. Date: Dec. 10, 2015

(65) Prior Publication Data
US 2017/0161594 A1    Jun. 8, 2017

(51) Int. Cl.
*G06K 15/02* (2006.01)
*B41J 2/21* (2006.01)
(Continued)

(52) U.S. Cl.
CPC ......... *G06K 15/027* (2013.01); *B41J 2/2146* (2013.01); *B41J 2/505* (2013.01); *B41J 29/38* (2013.01);
(Continued)

(58) Field of Classification Search
CPC .. G06K 15/027; G06K 15/107; G06K 15/105; G06K 2215/111; G06K 2215/101;
(Continued)

(56) References Cited

U.S. PATENT DOCUMENTS 6,688,726 B2    2/2004    Bauer et al.
7,118,188 B2   10/2006    Vilanova et al.
(Continued)

FOREIGN PATENT DOCUMENTS

EP    0034060      8/1981
EP    1452313      9/2004

OTHER PUBLICATIONS

Boley, J. William, et al. "Effect of Print Masks on the Functional Performance of Inkjet Printed Pd Hexadecanethiolate in Toluene," NIP & Digital Fabrication Conference. vol. 2013. No. 2. Society for Imaging Science and Technology, 2013.

*Primary Examiner* — Henok Legesse
(74) *Attorney, Agent, or Firm* — Michael A. Dryja

(57) ABSTRACT

A method in a page-wide array printing apparatus comprising at least first and second printing dies that overlap in a page width direction comprises the steps of calibrating the printing apparatus in a media advance direction to a higher resolution than the page width direction, the media advance direction being perpendicular to the page width direction, and using printing masks to control the operation of a plurality of nozzles in an overlap area between the first and second printing dies to reduce any visible defects caused by dot placement errors in the page width direction.

20 Claims, 15 Drawing Sheets

(51) Int. Cl.
   *G06K 15/10* (2006.01)
   *B41J 2/505* (2006.01)
   *B41J 29/38* (2006.01)

(52) U.S. Cl.
   CPC ......... *G06K 15/105* (2013.01); *G06K 15/107* (2013.01); *G06K 2215/101* (2013.01); *G06K 2215/111* (2013.01)

(58) Field of Classification Search
   CPC ....... G06K 15/102; B41J 29/38; B41J 2/2132; B41J 2/5056; B41J 2/155; B41J 2/2135; B41J 2/04505; B41J 2/04508
   See application file for complete search history.

(56) References Cited

U.S. PATENT DOCUMENTS

| | | |
|---|---|---|
| 7,261,388 B2 | 8/2007 | Vega et al. |
| 2004/0252152 A1* | 12/2004 | Vilanova ............ B41J 2/01 347/19 |
| 2008/0284804 A1* | 11/2008 | Seccombe ............ B41J 2/5056 347/9 |
| 2011/0012949 A1 | 1/2011 | Enge et al. |
| 2013/0063511 A1 | 3/2013 | Gardner et al. |

* cited by examiner

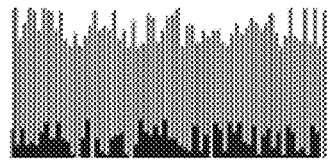 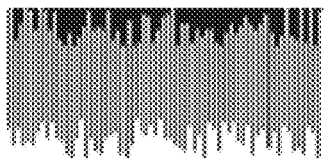
Figure 8a    Figure 8b
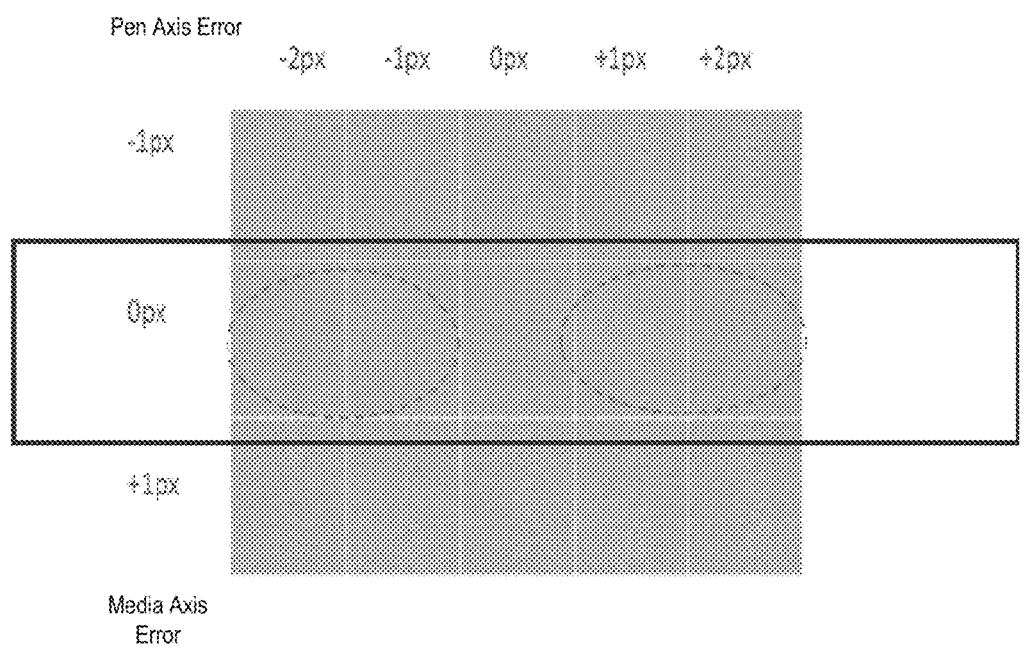
Figure 8c

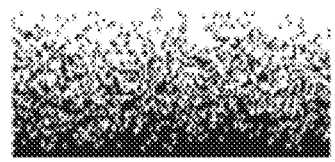
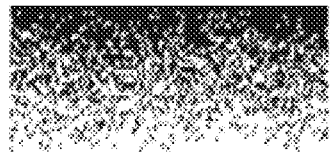
Figure 9a        Figure 9b
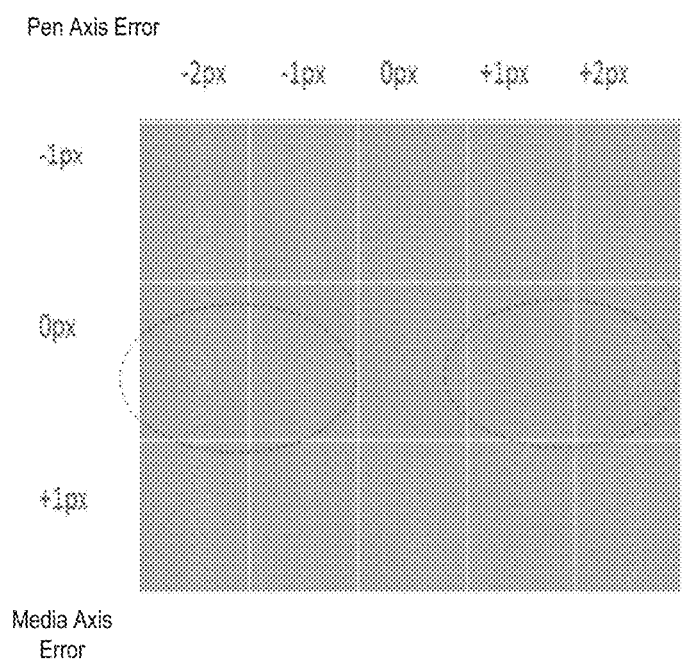
Figure 9c

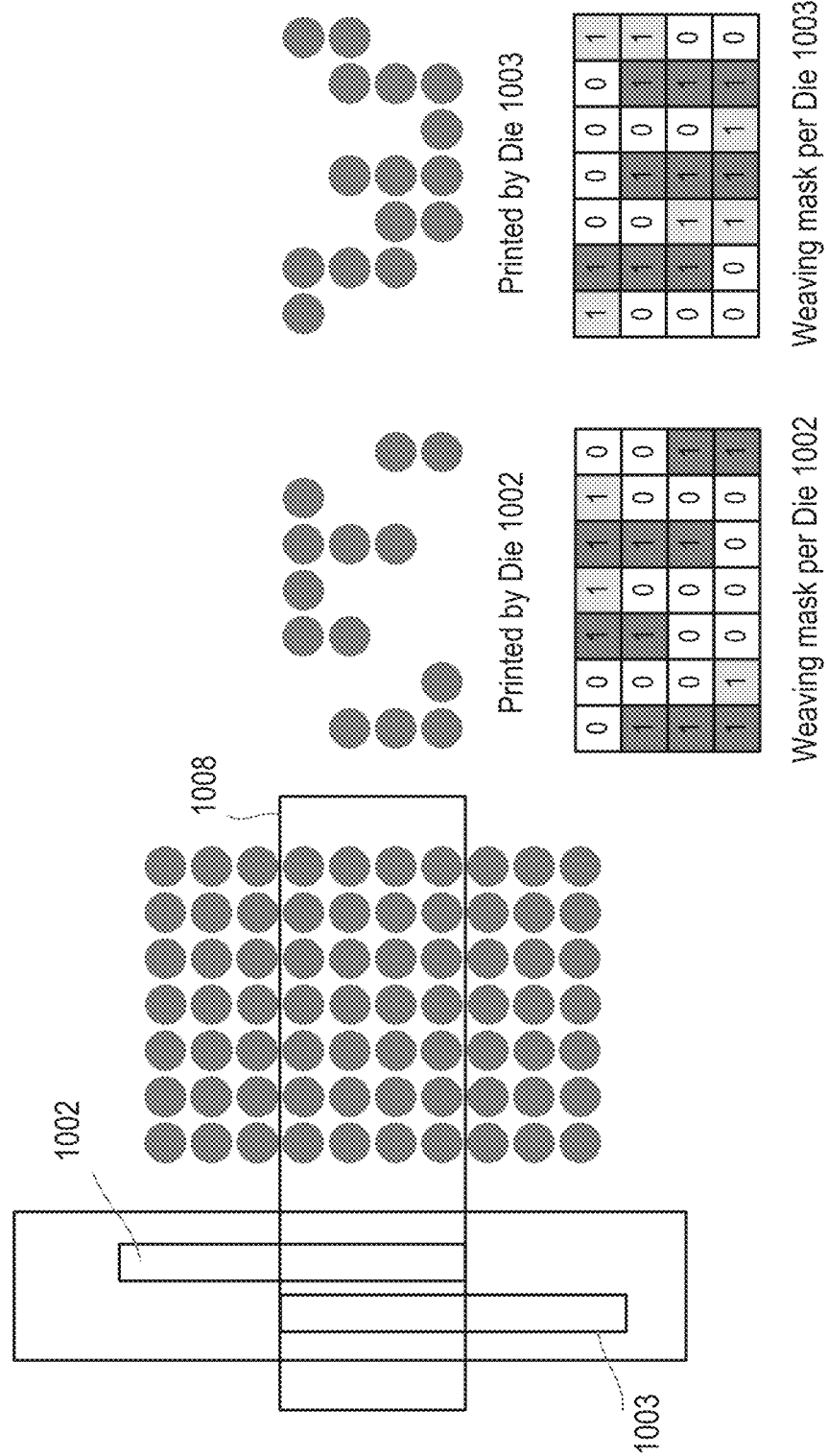

PAGE-WIDE ARRAY PRINTING

CROSS-REFERENCE TO RELATED APPLICATION

This application is a U.S. National Stage Application of and claims priority to International Patent Application No. PCT/EP2014/061737, filed on Jun. 5, 2014, and entitled "Page-Wide Array Printing," which is hereby incorporated by reference in its entirety.

In a page-wide array printing apparatus the overlap area between printing dies or print-heads (PHs) is one of the factors that may contribute to visible defects in the form of Image Quality (IQ) artefacts. This is because of the high printing resolution and small drop volume in such systems, and the tendency to use one-pass print-modes for different plot qualities. Another reason is that repetition of overlap areas may occur multiple times along the width of the plot. The multiple repetitions, for example if equally spaced, may increase the visibility of defects, since a clear defect at two consecutive positions may lead to image quality problems being observable by a viewer. Dot placement error (DPE) may also be a cause of die stitching IQ artefacts at die boundaries. Other factors may also contribute to IQ artefacts at die boundaries.

For a better understanding of the examples described herein, and to show more clearly how the examples may be carried into effect, reference will now be made, by way of example only, to the following drawings in which.

Figure 3:
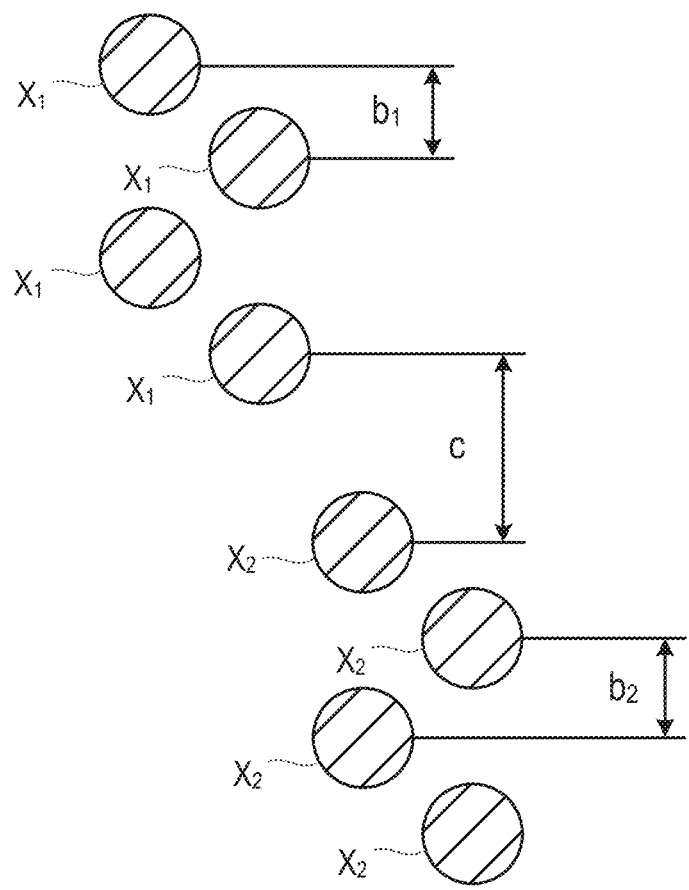
Figure 4:
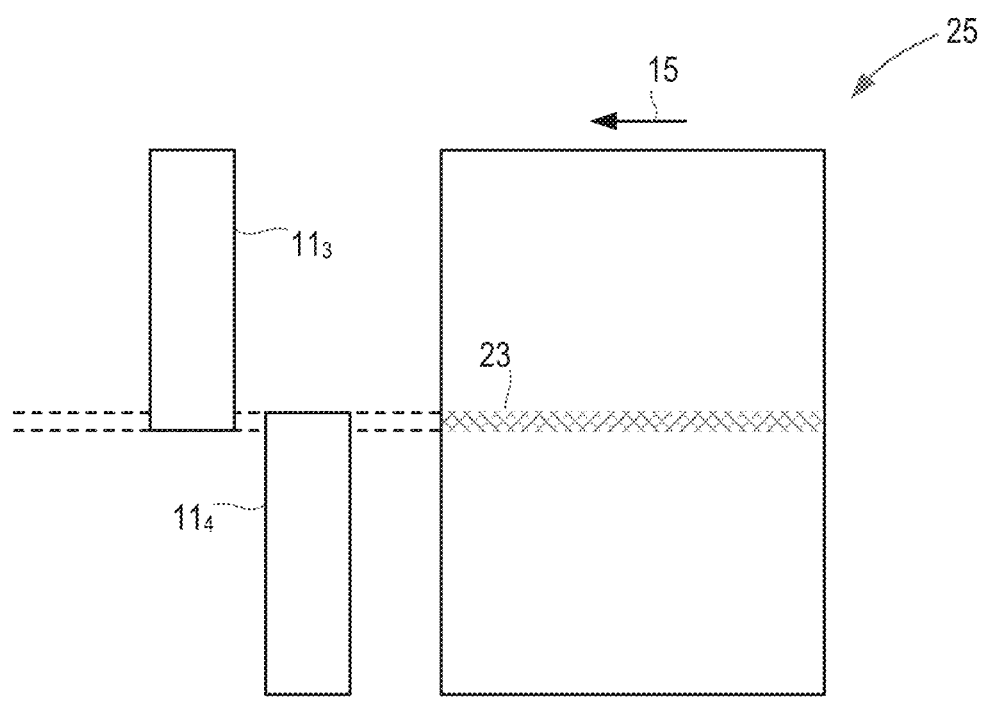
Figure 5:
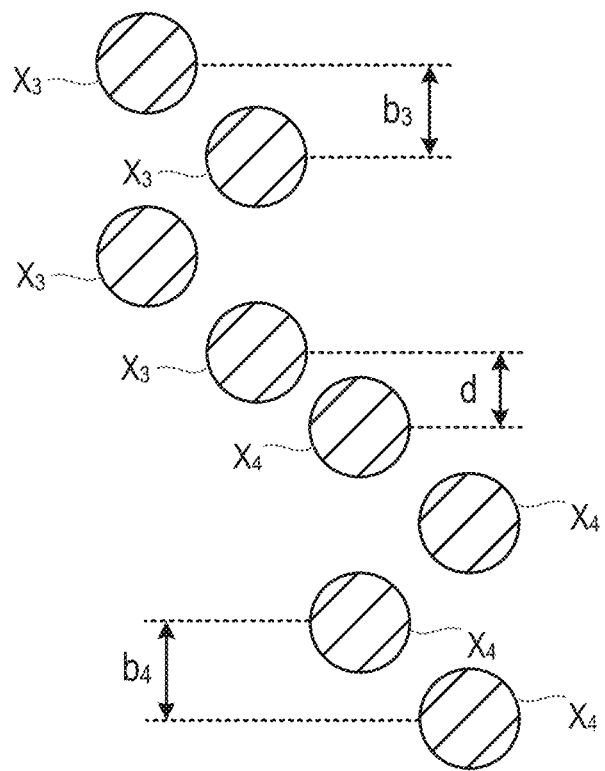
Figure 7:
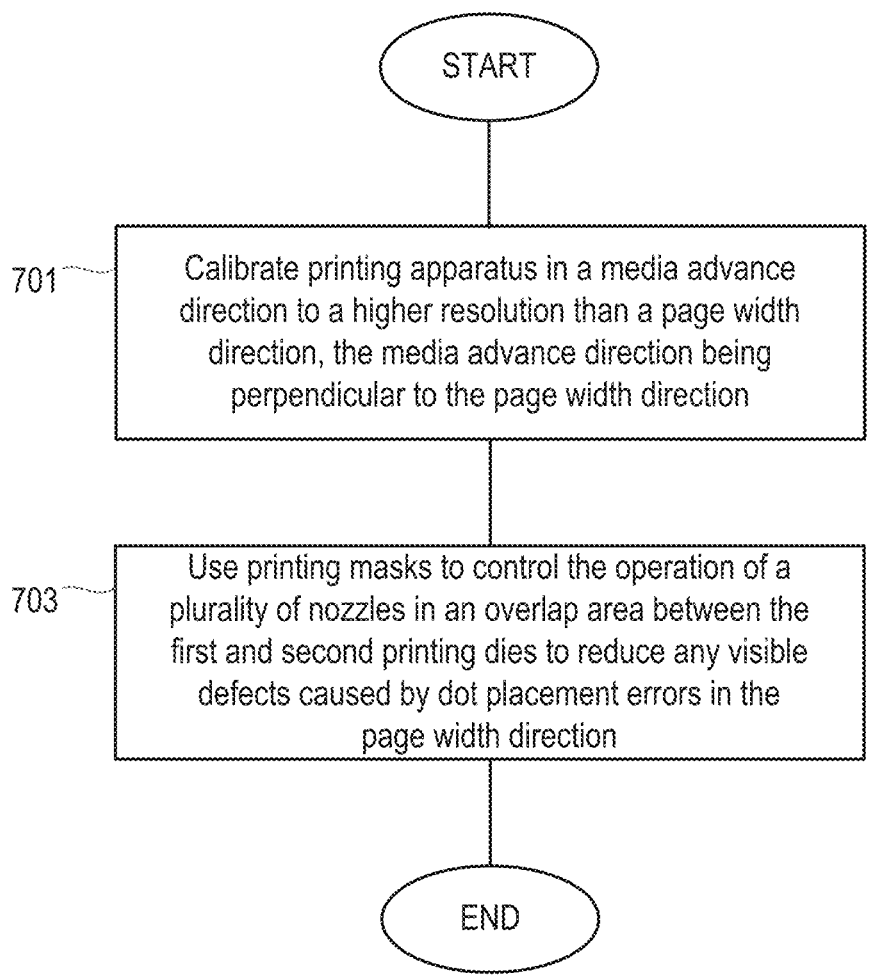
Figure 8D:
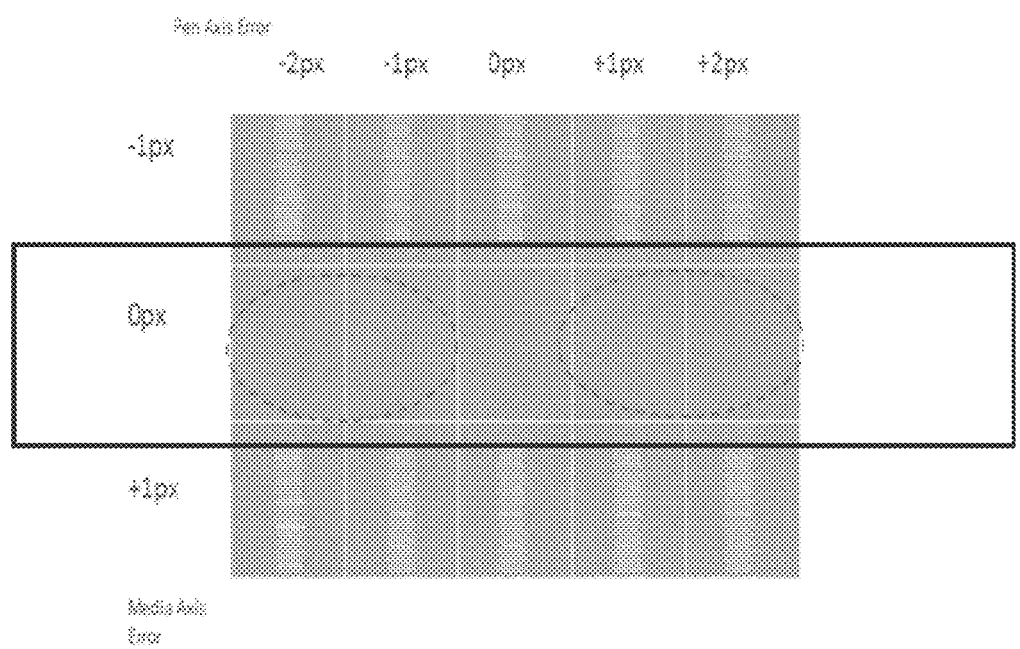
Figure 9D:
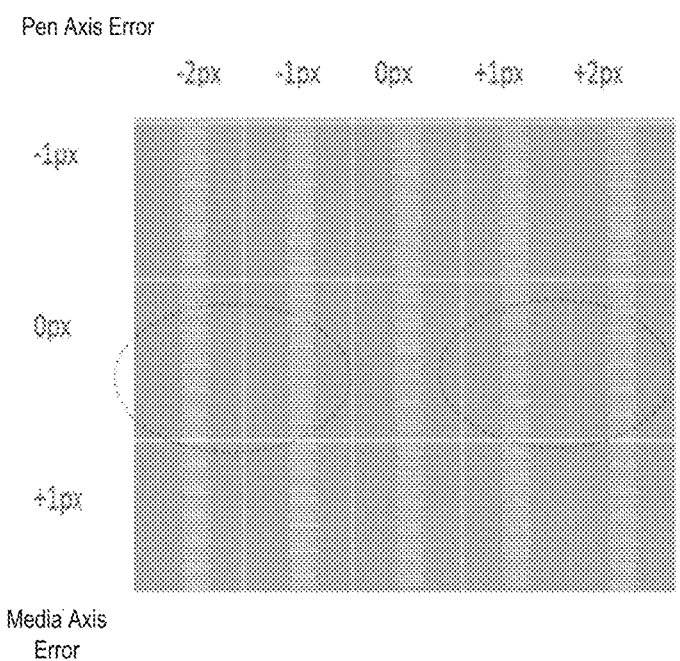
Figure 10:
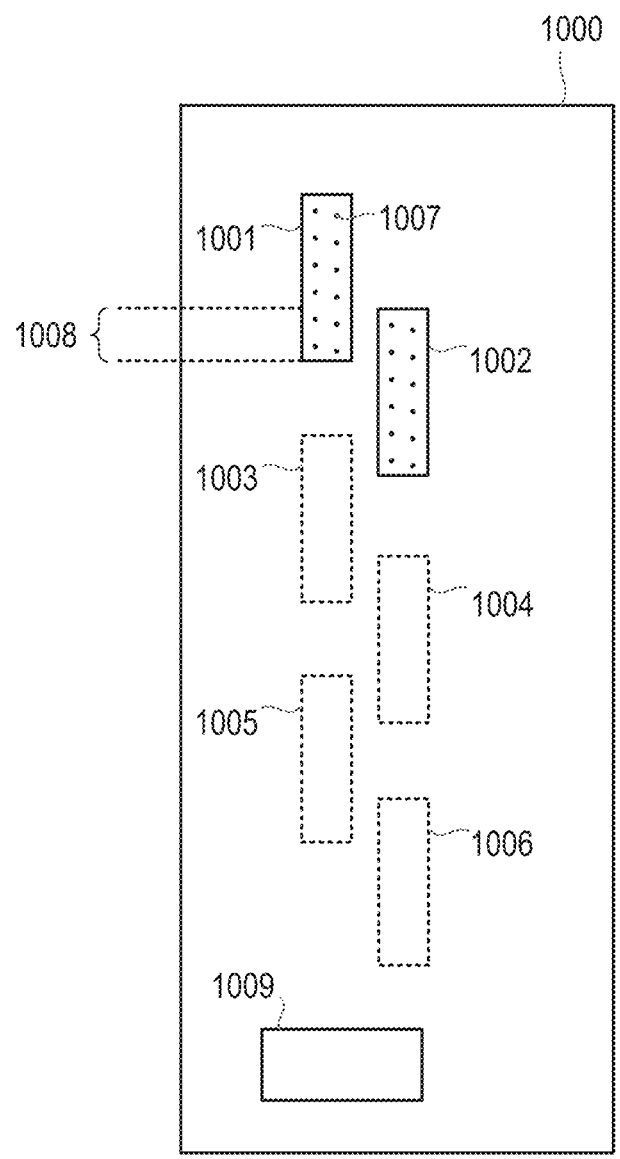

FIG. 3 provides further details illustrating negative overlap;

FIG. 4 is an example illustrating positive overlap between adjacent printing dies;

FIGS. 5 and 6 provide further details illustrating positive overlap;

FIG. 7 shows an example of a method;

FIGS. 8a and 8b show examples of a printing mask for use in a method;

FIG. 8c illustrates an example of the results of printing using the printing masks of FIGS. 8a and 8b;

FIG. 8d shows an exaggerated version of FIG. 8c for illustrative purposes;

FIGS. 9a and 9b show examples of other printing masks;

FIG. 9c illustrates the results of printing using the printing masks of FIGS. 9a and 9b;

FIG. 9d shows an exaggerated version of FIG. 9c for illustrative purposes;

FIG. 10 shows an example of a page-wide array printing apparatus; and

FIG. 11 provides further details relating to examples of printing masks.

DETAILED DESCRIPTION

It is noted that the methods and apparatus described in the examples herein are made in the context of a page-wide array printing apparatus comprising at least first and second printing dies that overlap in a page width direction. Some of the examples will be described in relation to a printing apparatus comprising six printing dies located in a single print head, and with each printing die comprising rows of nozzles, for example two rows. It is noted, however, that the examples are not limited to these examples for reducing visible defects in an overlap area between printing dies, and that other configurations can be used. For example, a page-wide array printing apparatus may comprise multiple print head assemblies forming the page width, and/or a different numbers of printing dies on a print head assembly, and/or a different number of rows of nozzles (and/or different number of nozzles) on each printing die.

It is also noted that the term printing die embraces any module or unit that comprises a plurality of nozzles (also known as ink jets or openings or dot forming elements), and is sometimes referred to as a jetting module.

Prior to discussing the examples, an explanation will first be given about the operation of a page-wide array printing apparatus.

Figure 1A:
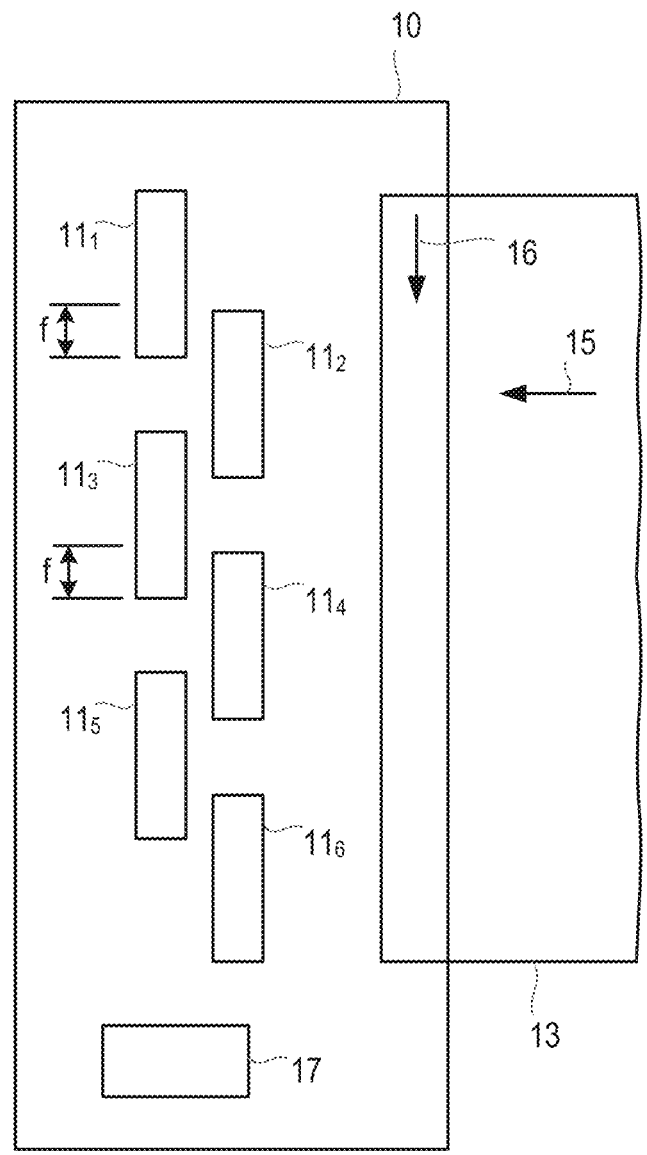
FIG. 1 shows an example of a page-wide array printing apparatus.
Figure 1B:
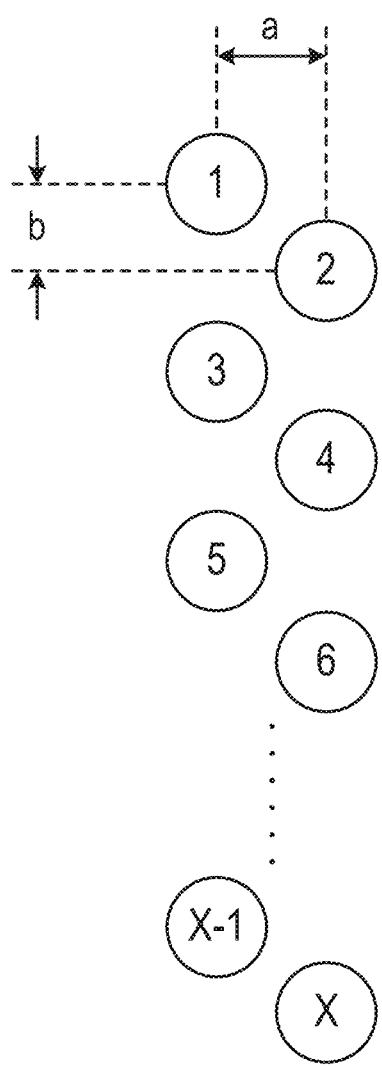

FIG. 1a shows an example of a page-wide array printing apparatus 10, for example an inkjet printer, comprising six printing dies $11_1$ to $11_6$. Each printing die $11_1$ to $11_6$ comprises a plurality of nozzles, for example, two rows of nozzles which are offset from one another, or staggered, (as shown in FIG. 1b) and arranged to fire ink drops onto a print medium 13, as the print medium 13 is advanced through the printer apparatus in a direction indicated by arrow 15 (referred to hereinafter as the "media advance direction", also known as the media axis, or cross pen direction). The printer apparatus 10 comprises a control unit 17 for controlling the operation of the printer apparatus. The direction substantially perpendicular to the media advance direction will be referred to hereinafter as the "page width direction 16", and is also known as the pen direction or pen axis, or print-head direction.

The printing dies $11_1$ to $11_6$ are arranged to overlap as shown (although this overlap area "f" is exaggerated in FIG. 1a for illustrative purposes). As can be seen in FIG. 1b, the nozzles are arranged in two rows, with each row of nozzles being spaced by a distance "a", for example 21.167 microns (one twelve-hundredth of an inch) and the nozzles in the two rows being mutually staggered by a distance "b", so that the successive nozzles in each die are spaced, for example, by 21.167 microns (one twelve-hundredth of an inch), 1 micron being equal to 1 micrometer or $10^{-6}$ meters. It is noted that these dimension are provided for illustrative purposes only.

It is also noted that the printing dies $11_1$ to $11_6$ may form part of a print head assembly (not shown), and that a plurality of such print head assemblies may be arranged along the width of a page of a larger printing apparatus, whereby the print head assemblies are also arranged to overlap one another, for example in a similar manner to the printing dies of FIG. 1a.

Figure 2:
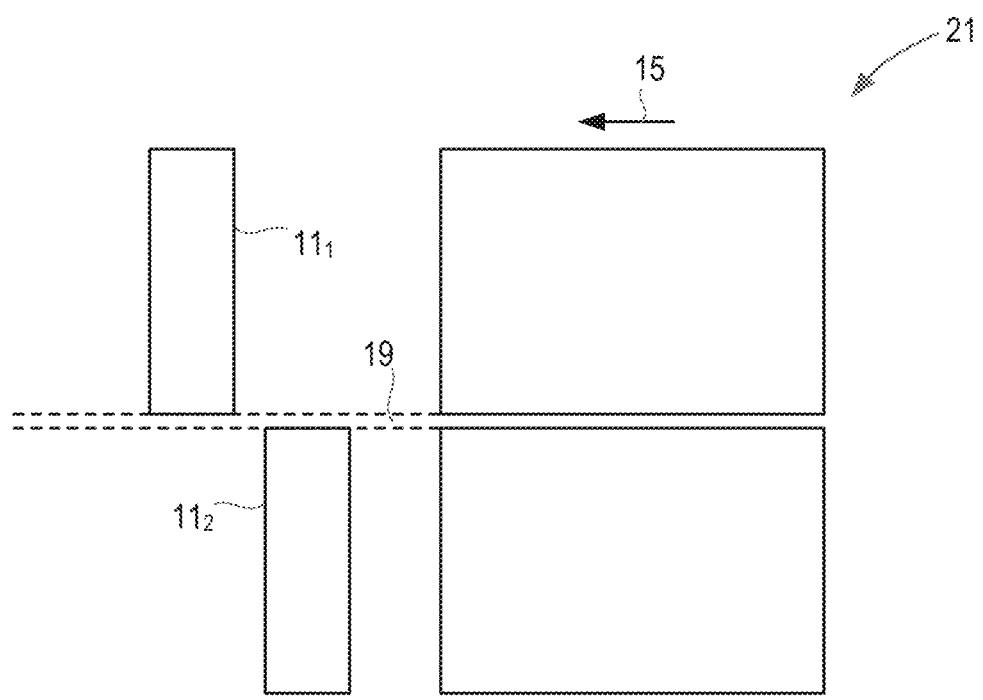
FIG. 2 shows an example illustrating negative overlap between adjacent printing dies.

FIG. 2 shows an arrangement in which, due to an error in the relative positioning of two of the printing dies, for example printing dies $11_1$ and $11_2$, a gap exists in the overlapping region between the two printing dies, which will result in a light band or gap 19 being produced in the image content 21 being printed by the printing dies $11_1$ and $11_2$ as the print media moves in the media advance direction 15. This is termed negative overlap, i.e. because a gap exists between nozzles of the printing dies.

FIG. 3 shows an enlarged view of the ink drops $X_1$ and $X_2$ printed by the nozzles at the adjacent ends of printing dies $11_1$ and $11_2$ in the case of negative overlap. The staggered spacing or pitch "$b_1$" between the adjacent rows of nozzles $k_1$ in print head die $11_1$ is 21.167 microns, for example, (i.e. one twelve-hundredth of an inch) as is the spacing "$b_2$" between the adjacent rows of nozzles $X_2$ in print head die $11_2$. However, the spacing "c" between the end nozzle $X_1$ of printing die $11_1$ and the nearest nozzle $X_2$ of printing die $11_2$ is greater than 21.167 microns (greater than one twelve-hundredth of an inch), thus leading to the appearance of gap 19 shown in FIG. 2.

FIG. 4 shows an arrangement in which, due to an error in the relative positioning of the printing dies, $11_3$ and $11_4$ for example, a dark band 23 is produced in the image content 25 being printed by the printing dies $11_3$ and $11_4$ as the print medium 13 advances in a media advance direction 15. This is called positive overlap.

FIG. 5 shows an enlarged view of the ink drops $X_3$ and $X_4$ printed by the nozzles at the adjacent ends of printing dies $11_3$ and $11_4$ respectively in the case of positive overlap. The staggered spacing or pitch "$b_3$" between the adjacent rows of nozzles $X_3$ in printing die $11_3$ is 21.167 microns, for example, (i.e. one twelve-hundredth of an inch) as is the spacing "$b_4$" between the adjacent rows of nozzles $X_4$ in printing die $11_4$. However, the spacing "d" between the end nozzle $X_3$ of printing die $11_3$ and the nearest nozzle $X_4$ of printing die $11_4$ is less than 21.167 microns (less than one twelve-hundredth of an inch), thus creating a positive overlap. Positive overlap is said to exist not just where the ink drops actually overlap in the page width direction 16, i.e. perpendicular to the media advance direction 15, but also in the case where the distance between the end nozzles of printing die $11_3$ and the nearest nozzle of printing die $11_4$ is less than 21.167 microns (one twelve-hundredth of an inch), as shown in FIG. 5.

Positive overlap can occur even when, as in FIG. 5, all the ink drops are precisely circular.

Figure 6A:
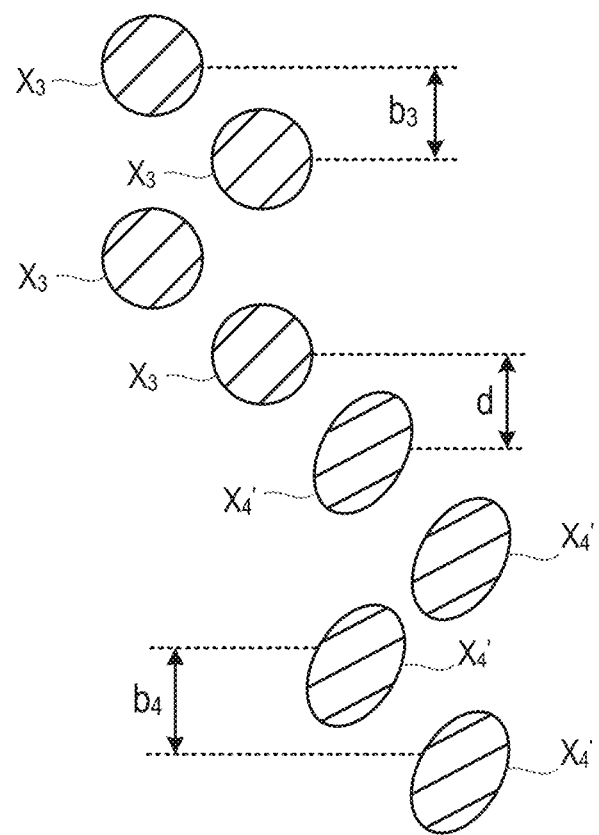

FIG. 6a shows a situation in which the shape of the drops $X_4'$ of the printing die $11_4$ are not quite circular, and this has an additional influence on the effective positive overlap between printing dies $11_3$ and $11_4$, for example.

Figure 6B:
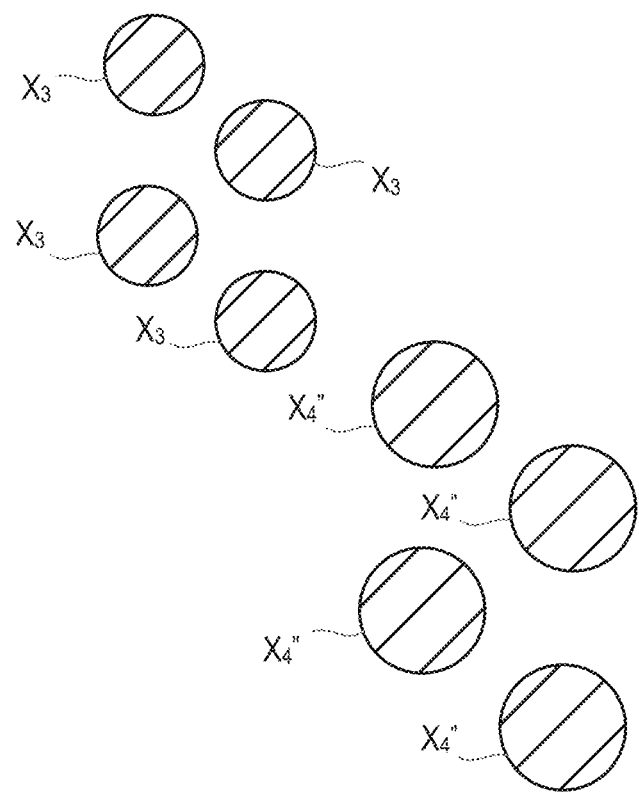

In FIG. 6b, the size of the drops $X_4"$ printed by the nozzles of the end of printing die $11_4$ (also known as the "drop weight") is larger than that of drops $X_3$ of the printing die $11_3$, and this has an additional influence on the effective positive overlap between printing dies $11_3$ and $11_4$. Even if the spacing between the end nozzles of die $11_3$ and the end nozzles of die $11_4$ has the desired value of 21.167 microns (one twelve-hundredth of an inch), incorrectly shaped (FIG. 6a) and/or sized (FIG. 6b) ink drops can produce similar effects as incorrect overlap, which can be corrected, at least partly, by the examples described herein.

There is an additional factor which has an effect on the width of the gap 19 or the band 23 and this is known as "swath height error" or SHE. SHE is explained in U.S. Pat. No. 6,375,307. This effect arises when the height of the printing head die (i.e. its long dimension) is not equal to the corresponding dimension of the image content actually printed. When the end nozzles of a printing die eject ink drops in a direction away from the central nozzles of the printing die, the printed swath height is greater than the theoretical swath height (i.e. as measured on the printing die itself) and this is known as positive SHE. When the end nozzles of a printing die eject ink drops in a direction towards the central nozzles of the printing die, the printed swath height is less than the theoretical swath height, and this is known as negative SHE.

With a view to overcoming or reducing the presence of visible gaps or bands in the printed image despite all the above issues, the printing dies of a printer apparatus 10 are deliberately set with a small overlap (which has been shown in exaggerated manner in FIG. 1 for the purposes of explanation).

Furthermore, in the overlap region nozzle redundancy may be provided. This means that to print a pixel the printer can choose between two nozzles from different printing dies to fire the resultant dot. In order to split the work between the two printing dies the printer uses a mask called a "weaving mask".

As a result of the redundancy of nozzles in the region where adjacent dies overlap, this gives flexibility for compensating for gaps 19 or band 23 produced by inaccuracies in locating the dies and thus in setting the overlap dimension, and the additional printing artefacts caused by swath height error.

The examples described herein are concerned with a die stitching strategy for reducing the effects of IQ artefacts in such overlapping regions, and for a wide range of media types and speeds.

The examples provide a method and apparatus for reducing the visible effects of dot placement error (DPE) in an overlap area between at least first and second printing dies, which as can be seen from the description above is one of the contributors to the output quality of a page-wide array printing system. It is noted that the first and second printing dies may be located on the same print head assembly, or located on separate adjacent print-head assemblies.

FIG. 7 shows the steps performed by an example of a method, in a page-wide array printing apparatus comprising at least first and second printing dies that overlap in a page width direction. The method comprises the step of calibrating the printing apparatus in a media advance direction to a higher resolution than the page width direction, the media advance direction being perpendicular to the page width direction, step 701. Printing masks are used to control the operation of a plurality of nozzles in an overlap area between the first and second dies to reduce any visible defects caused by dot placement errors in the page width direction.

The step of calibrating may comprise calibrating die to die position tolerances in a media advance direction to a higher resolution than the page width direction. Calibrating the die to die position tolerances can be made, for example, by printing a particular designed pattern with portions from overlapping printing dies, and inferring from the measures of a sensor the relative distance of overlapping dies, either in the media advance or page width direction. The accuracy of the measure, relevant to the examples described herein, is dependent on the printing resolution of the pattern, which is higher in the media advance direction than the page width direction.

By combining a high accuracy calibration in the media advance direction and printing masks to provide a weaving strategy robust against drop placement errors in the page width direction (also referred to as the pen direction or print-head direction), this has the advantage of minimizing artefacts in the die overlap area. As such, the weaving masks with most robustness against dot placement errors are applied in the direction that can be calibrated with less accuracy. In the example shown, SHE is an example of a source of drop placement error affecting pen direction and not media direction. This and other sources of drop placement error in the pen direction (not media direction) allow for a less accurate calibration in the pen direction in comparison with media direction. The printing masks hide residual errors in a pen direction (perpendicular to the media direction).

According to one example, the printing masks comprise split weaving masks.

According to one example the printing masks comprise random split weaving masks. In one example the random split weaving masks control operation of first and second nozzles of a plurality of nozzle pairs in the overlap area in a random manner, as will be described in further detail later in the application.

A single pixel is printed by one or the other of the first and second nozzles of a nozzle pair, the first and second nozzles being nozzles from separate printing dies in the overlap area. A particular pixel is therefore printed in a random manner by either the first or second nozzles of a nozzle pair, according to the random split weaving masks that control the operation of a plurality of nozzles of the first and second printing dies in an overlap area (further details of which will be described later in relation to FIG. 11).

Therefore, according to one example the printing masks comprise random split weaving masks for controlling operation of a group of nozzles in the overlap area in a random manner, wherein the group of nozzles comprise a plurality of redundant nozzles.

According to one example a random split weaving mask controls operation of the first and second nozzles of a nozzle pair independently of a printing speed.

The examples therefore combine a high accuracy printhead calibration in the media advance direction and a set of corresponding printing masks, for example random split weaving masks, that hide the visibility of a broad drop placement error (in sources origin and magnitude) in the print-head direction. The examples provide a die stitching solution that applies to different printing media (with different errors patterns due to ink media interaction) and different printing speeds, with varying print-head direction DPE due to dynamic swath height error.

There are many contributors to drop placement error (DPE). On the one hand, several general mechanical tolerances contribute to the dot placement error in the overlap zone of printing dies.

For example, these include the mechanical tolerances from printing die to printing die (die-to-die) and from print head to print head in an apparatus comprising multiple print heads (PH-to-PH), both in the page width direction 16 (i.e. the print head axis or pen direction) and the media advance direction 15 (also known as the cross pen axis).

Variations in speed of media advance are also a contributor to DPE. For example, these can be caused by:
 a. Geometric tolerances of a roller and an encoder in a belt system of a printing apparatus (in the media advance direction 15)
 b. Snake-like variation in speed in the pen direction, and differential advance (mainly in page width direction 16)
 c. Punctual disturbances due to the media loop and cutting (mainly in the page width direction 16)

On the other hand, there are some tolerances which are specific to printing conditions. For example these include:
 d. media dependent (dot gain/ink media interaction and thickness)
 e. printing speed dependent
 f. image content dependent The last two cases, i.e. the printing speed dependent and image content dependent tolerances, are at least partly due to Dynamic Swath Height Error (DSHE). These printing specific errors contribute mainly to errors in the page width direction 16, and are difficult to compensate for. It is therefore more difficult to calibrate in this page width direction.

The examples described herein have the advantage of providing a way to mitigate or reduce the visibility of defects in the image quality, by applying the weaving masks with most robustness against dot placement errors in the direction that can be calibrated with less accuracy.

From the list of contributors to DPE in the overlap area classified by source origin, as mentioned above, it can be seen that die-to-die (including PH-to-PH) cross pen axis positioning tolerance (i.e. in a media direction 15) and geometric tolerances of a roller and encoder of a belt system contribute to the media advance direction 15. These two sources of error can be calibrated (being stable enough in time) and not specific to printing conditions.

Furthermore, in this direction there is a higher resolution to print/calibrate. For example, by doubling the firing frequency a 2400 dpi printing resolution can be achieved in the media advance direction 15 versus 1200 dpi in the page width direction 16 (which is fixed by nozzle spacing).

The examples described herein exploit the higher resolution and more controlled DPE in the media advance direction to rely on printing masks in the overlap zone (for example in the form of random split weaving masks) to hide any residual errors in the page width direction 16, given a predetermined accuracy (for example an accuracy better than 10 um, or between 5-10 um) in the perpendicular direction (the media advance direction 15).

Thus, the examples provide a predetermined accuracy in the media advance direction, for example less than about 10 um, or between 5 to 10 um, which is a higher calibration than that applied to the page width direction. A method in the page-wide array printing apparatus can therefore comprise the step of calibrating the printer apparatus to an accuracy of better than 10 um in the media advance direction, or to an accuracy of between 5 to 10 um in the media advance direction. It is noted that 10 um is approximately the size of half a pixel at 1200 dpi (dots per inch), and the size of 1 pixel at 2400 dpi. In the media advance direction (which has double the resolution of the pen direction in an example), a 5-10 um accuracy is effectively an accuracy of less than a pixel in the printing resolution.

The media advance belt roller and encoder geometry tolerances (which do not change over time) can be calibrated, for example, during assembly in an assembly line with external tools. It has been seen that this form of calibration is very precise. For example, the residual of the calibration does not induce more than 4 um error bias on the die-to-die media axis direction. Alternatively the calibration may be performed in situ, or during use.

On the other hand, the die-to-die position tolerances (within a single print head PH, or from print head to print head, i.e. PH-to-PH) are measured, for example, using vernier like patterns, similar to ones used in calibration in the page width or pen direction 16, typically of 0.5 to 1 pixel resolution.

Therefore, according to one example a method further comprises the step of calibrating the printer apparatus to an accuracy of between 10 um to 20 um in the page width direction (or 0.5 to 1 pixel, since 1 pixel is approximately 20 um in 1200 dpi, page width resolution). The accuracy of the calibration of the printer apparatus in a page width direction is lower than the accuracy of the calibration of the printer apparatus in a media advance direction, which by being at 2400 dpi can achieve an effective resolution of 5 to 10 um.

As described above, the examples use printing masks that comprise random split weaving masks. These comprise a printing mask for the overlap region (weaving masks) that can make image quality very robust to one direction, given that the error on the media advance direction (i.e. a direction perpendicular to the pen direction 16) is very low (for example less than half a pixel, or less than 10 um).

Further details will now be provided of examples of random split weaving masks, and the advantages these have over other types of printing masks.

In the overlap region between first and second dies, nozzle redundancy is provided. This means that to print a pixel the printing apparatus can choose, for example, between two nozzles from different dies to fire the resultant dot. In order to split the work between the two dies the printer uses a printing mask.

FIGS. 8a and 8b show examples of the aspect of a pair of random split weaving masks. Each printing die prints, for example, alternating columns. The size of each column is randomly variable to avoid boundary effects at the ends of the printing dies in the overlap area.

FIG. 8c shows the result of printing using the random split weaving masks, showing pen axis error versus media axis error. Each of the squares shows the artefacts that appear in the output image around the die overlap zone, resulting in a different combination of dot placement errors in both the print-head or pen direction and the media advance direction, in steps of 1 pixel (px). The artefacts in the overlap region along the pen direction or axis (i.e. print head direction, perpendicular to the media advance direction) are reduced such that they cannot be detected by the human eye. This is as a result of using random split weaving masks in the pen direction, and avoiding dot placement errors in the media advance direction by calibrating the printing apparatus to a predetermined level in the media advance direction, for example less than 10 um.

The use of random split weaving masks has advantages over other types of weaving masks. For example, FIGS. 9a and 9b show the aspect of a pair of random tapered weaving masks. FIG. 9c shows the result of printing using the random tapered weaving masks, showing pen axis error versus media axis error. Each of the squares shows the artefacts that appear in the output image around the die overlap zone, resulting in a different combination of dot placement errors in both the print-head or pen direction and the media advance direction, in steps of 1 pixel (px). Artefacts in the die overlap region are visible no matter the direction of the dot position error. Also the visibility of the image quality defect increases with the error.

Thus, when comparing FIGS. 8c and 9c, it can be seen that when the error in the media advance direction (media axis) is low (center horizontal band), because the media advance direction has been calibrated to a certain or predetermined level, then the defects in image are much less visible for the random split weaving masks according to the examples, when compared with random tapered weaving masks.

With a high accuracy alignment on the media axis (media advance direction), FIG. 8c shows the range of errors that are moving across (the central band in FIG. 8c). When interpreting FIGS. 8c and 9c, it is noted that the position of the ovals is less relevant, with the noise of the artefact in the overlap area being the more relevant aspect, i.e. the ovals are used to show the visible effect of the errors in the grey print (which can be seen in FIGS. 8c and 9c if the grey print is studied closely). In FIG. 8c the artefact is less visible than in FIG. 9c within the central band, which illustrates the robustness of the random split weaving mask against deviations on the pen axis, as explained before. In other words, the ovals in FIGS. 8c and 9c are shown to merely help illustrate the interesting part of the possible errors, with the graininess of the grey print in the overlap area being the detail which shows the differences between FIGS. 8c and 9c. In FIG. 8c a difference in graininess is clearly visible, since in FIG. 8c the vertical bands in the middle of the squares are less visible within the oval sections.

In view of the noise artefacts in FIGS. 8c and 9c being faint in the images provided, FIGS. 8d and 9d are provided to help illustrate the difference further, by exaggerating the noise artefacts of FIGS. 8c and 9c respectively.

FIG. 10 shows a page-wide array printing apparatus 1000 according to an example. The page-wide array printing apparatus comprises, during use, at least first and second printing dies 1001, 1002 that overlap in a page width direction. The at least first and second printing dies 1001, 1002 comprise a plurality of printing nozzles 1007 in an overlap area 1008 of the first and second printing dies. The page-wide array comprises a control unit 1009. The control unit 1009 controls the operation of the plurality of nozzles 1007 in the overlap area using a printing mask that reduces any visible defects caused by dot placement errors in the page width direction. The printing apparatus 1000 is calibrated in a media advance direction to a predetermined resolution, the media advance direction being perpendicular to the page width direction.

For example, the predetermined resolution may be a high resolution, or a resolution which is higher than the resolution of calibration in a page width direction.

The printing mask may comprise a random split weaving printing mask.

In one example the controller controls operation of first and second nozzles of a plurality of nozzle pairs in the overlap area in a random manner.

In one example the controller controls operation of a group of nozzles in the overlap area in a random manner, wherein the group of nozzles comprise a plurality of redundant nozzles.

The page-wide array printing apparatus 1000 may comprise a printing mask memory (not shown) for storing printing masks.

FIG. 11 shows further details of an example of how random split weaving masks may be used to control the operation of a plurality of nozzles in an overlap area 1008 between first and second printing dies, for example printing dies 1002 and 1003.

The random split weaving masks operate as printing mask pairs, for example, if they control first and second printing dies 1002 and 1003 in an overlap area 1008. There is a correspondence between rows of the weaving mask and nozzles of the corresponding printing dies. The pair of random split weaving masks are built in a random manner, but once the weaving masks are built there is no randomness regarding which of the first or second nozzles (i.e. of a nozzle pair from the first and second printing dies, respectively) prints a particular pixel. FIG. 11 shows an example of the random pixels printed by the nozzles controlled by the random split weaving mask for printing die 1002, and the random pixels printed by the nozzles controlled by the random split weaving mask for printing die 1003.

It is noted that the random split weaving masks are complementary masks. According to one example the odd columns of a random split weaving mask are fired by a first die (for example the printing die 1002) and even columns by a second die (for example printing die 1003). The randomness may be applied, for example, to the height of these columns, with the columns with different heights illustrated by the dark shading in the printing masks. Because the pair of weaving masks are complementary masks, a dot in each pixel should be fired when these masks are superimposed. In an example, the number of pixels cut from the top and bottom of each column to make it shorter are randomly chosen. The part, on top or bottom or both, of each odd column that is not fired by printing die 1002 (i.e. because the column has been made shorter) is fired by printing die 1003 (as shown by the light shading in the odd columns of the printing mask for printing die 1003). In a similar manner, the top and bottom pixels of each even column not fired by printing die 1003 are fired by printing die 1002 for complementary reasons (shown by the light shading in the even columns of the printing mask for printing die 1002). Therefore, according to one example a first printing mask controls the firing of nozzles of a first printing die, wherein the first printing mask belongs to a pair of complementary random split weaving masks relating to an overlap area, the second printing mask in the complimentary pair controlling the firing of nozzles of a second printing die, wherein the first printing mask fires nozzles (pixels) in odd columns, wherein the heights of the odd columns are randomly selected, and wherein the first printing mask also fires any nozzles (pixels) in even columns which are not fired by the second weaving mask. In a similar manner, the second printing mask fires nozzles (pixels) in even columns, wherein the heights of the even columns are randomly selected, and wherein the second printing mask also fires any nozzles (pixels) in odd columns which are not fired by the first weaving mask.

Thus, according to one example a method comprises the steps of controlling the firing of a plurality of nozzles of a first printing die using a first printing mask, and controlling the firing of a plurality of nozzles of a second printing die using a second printing mask, wherein the first printing mask and second printing mask belong to a pair of complementary random split weaving masks for controlling the firing of a plurality of nozzles in an overlap area of the first and second printing dies. The method comprises using the first printing mask to fire nozzles in odd columns, wherein the heights of the odd columns are randomly selected, and wherein the first printing mask is also used to fire any nozzles in even columns which are not fired by the second weaving mask. The method further comprises using the second printing mask to fire nozzles in even columns, wherein the heights of the even columns are randomly selected, and wherein the second printing mask is also used to fire any nozzles in odd columns which are not fired by the first weaving mask.

Due to this random factor, the weaving masks are different in each overlap zone, but the weaving strategy is the same in all cases. It is noted that the random split weaving masks remain similar in the case of miss alignment errors in the page width direction (perpendicular to the media advance direction), which has the advantage of making them robust to misalignment errors in this direction. Thus, in one example a first overlap area can have a first pair of complimentary random split weaving masks used to control the firing of a first plurality of nozzles, with a second overlap area having a second pair of complimentary random split weaving masks used to control the firing of a second plurality of nozzles (wherein the first and second plurality of nozzles have no nozzles in common, or where the first and second plurality of nozzles have at least some nozzles in common).

From the examples described herein it can be seen that by combining a high accuracy calibration on the media axis direction and a weaving strategy robust against drop placement error in the print-head direction, artefacts in a die overlap area can be minimized. As a consequence, the examples can help reduce undesired artefacts that might be present in 47 positions along a media width, for example, as many as die stitching areas along a single bar of page-wide array printing apparatus, solved in a way independent of media and printing speed.

The examples have the advantage of being capable of covering a broader dot placement error spectrum, both in the number of independent sources and in error magnitude.

It should be noted that the above-mentioned examples illustrate rather than limit the invention, and that those skilled in the art will be able to design many alternative examples without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method in a printing apparatus comprising a first and second printing dies that overlap in a page width direction, the method comprising:
   calibrating the printing apparatus both in a media advance direction and a page width direction, the printing apparatus calibrated in the media advance direction to a higher resolution than in the page width direction, the media advance direction being perpendicular to the page width direction; and
   using printing masks to control the operation of a plurality of nozzles in an overlap area between the first and second printing dies to reduce any visible defects caused by dot placement errors in the page width direction.

2. The method as claimed in claim 1, wherein the printing masks comprise split weaving masks.

3. The method as claimed in claim 1, wherein the printing masks comprise a complementary pair of random split weaving masks, each mask having columns corresponding to overlapping nozzle pairs along the page width direction and rows corresponding to swath height along the media advance direction,
   wherein for each column, one of the random split weaving masks controls which nozzles of the overlapping nozzle pairs of the column are fired for a limited number of adjacent rows of the column beginning at a beginning or end row of the rows.

4. The method as claimed in claim 3, wherein for each column, another of the random split weaving masks controls which nozzles of the overlapping nozzle pairs of the column are fired for the rows of the column other than the limited number of adjacent rows.

5. The method as claimed in claim 4, wherein for each odd column, a first random row as one of the beginning and the end row is selected, and a first random number less than the number of rows is selected, a first random split weaving mask controlling which nozzles of the overlapping nozzle pairs of the odd column are fired for the selected first random number of adjacent rows of the odd column beginning at the selected first random row.

6. The method as claimed in claim 5, wherein for each even column, a second random row as one of the beginning and the end row is selected, and a second random number less than the number of rows is selected, a second random split weaving mask controlling which nozzles of the overlapping nozzle pairs of the even column are fired for the selected second random number of adjacent rows of the even column beginning at the selected second random row.

7. The method as claimed in claim 1, further comprising calibrating the printer apparatus to an accuracy of better than 10 um in the media advance direction, or to an accuracy of between 5 to 10 um in the media advance direction.

8. The method as claimed in claim 1, further comprising calibrating the printer apparatus to an accuracy of between 10 um to 20 um in the page width direction.

9. The method as claimed in claim 1, wherein calibration of the page-wide array printing apparatus in a page width direction is to a lower accuracy than the calibration of the page-wide array printing apparatus in a media advance direction.

10. A page-wide array printing apparatus comprising:
a first and second printing dies that overlap in a page width direction, wherein the first and second printing dies comprise a plurality of printing nozzles in an overlap area of the first and second printing dies;
a control unit to control the operation of the plurality of nozzles in the overlap area using a printing mask that reduces any visible defects caused by dot placement errors in the page width direction;
wherein the printing apparatus is calibrated in a page width direction perpendicular to a media advance direction, using a complementary pair of random split weaving masks, each mask having columns corresponding to overlapping nozzle pairs along the page width direction and rows corresponding to swath height along the media advance direction, including a complementary pair of split weaving masks,
wherein for each column:
one of the random split weaving masks controls which nozzles of the overlapping nozzle pairs of the column are fired for a limited number of adjacent rows of the column beginning at a beginning or end row of the rows, and
another of the random split weaving masks controls which nozzles of the overlapping nozzle pairs of the column are fired for the rows of the column other than the limited number of adjacent rows.

11. The page-wide array printing apparatus as claimed in claim 10, wherein the predetermined resolution is a high resolution, or a resolution which is higher than the resolution of calibration in a page width direction.

12. The page-wide array printing apparatus as claimed in claim 10, wherein the printing mask comprises a random split weaving printing mask.

13. The page-wide array printing apparatus as claimed in claim 12, wherein the control unit controls operation of first and second nozzles of a plurality of nozzle pairs in the overlap area in a random manner.

14. The page-wide array printing apparatus as claimed in claim 12, wherein the control unit controls operation of a group of nozzles in the overlap area in a random manner, wherein the group of nozzles comprise a plurality of redundant nozzles.

15. The page-wide array printing apparatus as claimed in claim 10, further comprising a printing mask memory to store printing masks.

16. The page-wide array printing apparatus as claimed in claim 10, wherein the printing apparatus is also in the media advance direction, the printing apparatus calibrated in the media advance direction at a higher resolution than in the page width direction.

17. A print apparatus comprising:
a printhead having a first and second dies that overlap in a page width direction, wherein the first and second dies comprise a plurality of nozzles in an overlap area of the first and second dies;
a controller to:
calibrate the print apparatus both in a media advance direction and in a page width direction, the printing apparatus calibrated in the media advance direction to a higher resolution than in the page width direction, the media advance direction being perpendicular to the page width direction; and
control the operation of the plurality of nozzles in the overlap area to mask visible defects caused by dot placement errors in the page width direction.

18. The print apparatus of claim 17, wherein the controller is to:
control firing of a plurality of nozzles of the first die using a first print mask;
control firing of a plurality of nozzles of the second die using a second print mask; wherein the first print mask and the second print mask belong to a pair of complementary random split weaving masks for controlling firing of nozzles in the overlap area;
using the first print mask to fire nozzles in odd columns along the page width direction, wherein the heights of the odd columns are randomly selected, and wherein the first print mask is also used to fire any nozzles in even columns which are not fired by the second weaving mask; and
using the second print mask to fire nozzles in even columns along the page width direction, wherein the heights of the even columns are randomly selected, and wherein the second print mask is also used to fire any nozzles in odd columns which are not fired by the first weaving mask.

19. The print apparatus of claim 17, wherein the print apparatus is calibrated in the page width direction using a complementary pair of random split weaving masks, each mask having columns corresponding to overlapping nozzle pairs along the page width direction and rows corresponding to swath height along the media advance direction, including a complementary pair of split weaving masks,
wherein for each column:
one of the random split weaving masks controls which nozzles of the overlapping nozzle pairs of the column are fired for a limited number of adjacent rows of the column beginning at a beginning or end row of the rows, and
another of the random split weaving masks controls which nozzles of the overlapping nozzle pairs of the column are fired for the rows of the column other than the limited number of adjacent rows.

20. The print apparatus of claim 19, wherein for each odd column, a first random row as one of the beginning and the end row is selected, and a first random number less than the number of rows is selected, a first random split weaving mask controlling which nozzles of the overlapping nozzle pairs of the odd column are fired for the selected first random number of adjacent rows of the odd column beginning at the selected first random row,
and wherein for each even column, a second random row as one of the beginning and the end row is selected, and a second random number less than the number of rows is selected, a second random split weaving mask controlling which nozzles of the overlapping nozzle pairs of the even column are fired for the selected second random number of adjacent rows of the even column beginning at the selected second random row.

* * * * *

UNITED STATES PATENT AND TRADEMARK OFFICE
CERTIFICATE OF CORRECTION

PATENT NO. : 10,185,900 B2
APPLICATION NO. : 15/316463
DATED : January 22, 2019
INVENTOR(S) : Marcos Casaldaliga Albisu et al.

It is certified that error appears in the above-identified patent and that said Letters Patent is hereby corrected as shown below:

In the Claims

In Column 12, Line 16, in Claim 18, delete "mask;" and insert -- mask, --, therefor.

Signed and Sealed this
Sixteenth Day of April, 2019

Andrei Iancu
*Director of the United States Patent and Trademark Office*